United States Patent
Kuhles et al.

(10) Patent No.: US 9,392,071 B2
(45) Date of Patent: *Jul. 12, 2016

(54) COMPUTER NETWORK SYSTEM AND A METHOD FOR MONITORING AND CONTROLLING A NETWORK

(71) Applicant: International Business Machines Corporation, Armonk, NY (US)

(72) Inventors: Oliver Kuhles, Stuttgart (DE); Sascha Schwarz, Nieder Olm (DE); Thomas Urban, Steinenbronn (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/682,549

(22) Filed: Apr. 9, 2015

(65) Prior Publication Data

US 2015/0215416 A1    Jul. 30, 2015

Related U.S. Application Data

(63) Continuation of application No. 11/245,387, filed on Oct. 6, 2005, now Pat. No. 9,009,279.

(30) Foreign Application Priority Data

Oct. 11, 2004   (DE) .................... 041 04 969

(51) Int. Cl.
| | |
|---|---|
| *G06F 15/173* | (2006.01) |
| *H04L 29/08* | (2006.01) |
| *H04L 29/12* | (2006.01) |
| *H04L 12/26* | (2006.01) |
| *H04L 12/24* | (2006.01) |

(52) U.S. Cl.
CPC .......... *H04L 67/2814* (2013.01); *H04L 29/125* (2013.01); *H04L 29/12009* (2013.01); *H04L 29/12424* (2013.01); *H04L 41/022* (2013.01); *H04L 41/0226* (2013.01); *H04L 43/04* (2013.01); *H04L 61/2507* (2013.01);

(Continued)

(58) Field of Classification Search
None
See application file for complete search history.

(56) References Cited

U.S. PATENT DOCUMENTS

| 4,817,080 A | 3/1989 | Soha |
| 5,109,486 A | 4/1992 | Seymour |

(Continued)

FOREIGN PATENT DOCUMENTS

GB    2 320 115 A    6/1998

OTHER PUBLICATIONS

Non-Final Office Action dated Dec. 10, 2008 for U.S. Appl. No. 11/245,387.

(Continued)

*Primary Examiner* — Afshawn Towfighi
(74) *Attorney, Agent, or Firm* — Scully, Scott, Murphy & Presser, P.C.; John Pivnichny

(57) ABSTRACT

Discloses is a computer network system comprising a plurality of network management tools, a network segment comprising a plurality of hardware devices, and a proxy for interconnecting network management tools with the network segment. Each of the network management tools is assigned at least one functionality for monitoring and controlling at least one hardware device which is polled by the network management tools. The functionalities from different network management tools are separate from each other, and the proxy is set up to consolidate requests from the different network management tools and to focus the requests on one single request to the device to be controlled by the different network management tools.

20 Claims, 1 Drawing Sheet

(52) U.S. Cl.
CPC ........ *H04L61/2535* (2013.01); *H04L 61/2564* (2013.01); *H04L 67/28* (2013.01); *H04L 67/2833* (2013.01); *H04L 41/0213* (2013.01)

(56) References Cited

U.S. PATENT DOCUMENTS

| | | | |
|---|---|---|---|
| 5,229,988 | A | 7/1993 | Marbaker et al. |
| 5,751,963 | A | 5/1998 | Umetsu |
| 6,108,782 | A | 8/2000 | Fletcher et al. |
| 6,708,171 | B1 | 3/2004 | Waldo et al. |
| 6,832,239 | B1 | 12/2004 | Kraft et al. |
| 9,009,279 | B2 | 4/2015 | Kuhles et al. |
| 2002/0032751 | A1 | 3/2002 | Bharadwaj |
| 2003/0005455 | A1 | 1/2003 | Bowers |
| 2003/0182420 | A1 | 9/2003 | Jones et al. |
| 2004/0073596 | A1 | 4/2004 | Kloninger et al. |
| 2006/0095554 | A1 | 5/2006 | Kuhles et al. |

OTHER PUBLICATIONS

Amendment dated Feb. 18, 2009 for U.S. Appl. No. 11/245,387.
Final Office Action dated May 19, 2009 for U.S. Appl. No. 11/245,387.
Request for Continued Examination with Amendment dated Aug. 18, 2009 for U.S. Appl. No. 11/245,387.
Non-Final Office Action dated Oct. 26, 2009 for U.S. Appl. No. 11/245,387.
Amendment dated Mar. 15, 2010 for U.S. Appl. No. 11/245,387.
Final Office Action dated Jun. 8, 2010 for U.S. Appl. No. 11/245,387.
Request for Continued Examination with Amendment dated Sep. 8, 2010 for U.S. Appl. No. 11/245,387.
Non-Final Office Action dated Mar. 2, 2011 for U.S. Appl. No. 11/245,387.
Amendment dated Jun. 1, 2011 for U.S. Appl. No. 11/245,387.
Final Office Action dated Aug. 2, 2011 for U.S. Appl. No. 11/245,387.
Notice of Appeal dated Nov. 2, 2011 for U.S. Appl. No. 11/245,387.
Appeal Brief dated Jan. 3, 2012 for U.S. Appl. No. 11/245,387.
Examiner's Answer to Appeal Brief dated Mar. 12, 2012 for U.S. Appl. No. 11/245,387.
Reply Brief dated May 14, 2012 for U.S. Appl. No. 11/245,387.
Patent Board Decision dated Nov. 26, 2014 for U.S. Appl. No. 11/245,387.
Notice of Allowance and Fees due Dec. 8, 2014 for U.S. Appl. No. 11/245,387.

COMPUTER NETWORK SYSTEM AND A METHOD FOR MONITORING AND CONTROLLING A NETWORK

CROSS REFERENCE TO RELATED APPLICATION

This application is a continuation of U.S. patent application Ser. No. 11/245,387, filed Oct. 6, 2005, the entire content and disclosure of which is hereby incorporated herein by reference.

BACKGROUND OF THE INVENTION

1. Field of the Invention

The invention relates in general to a method for monitoring the performance of a computer network, and in particular to a method for monitoring and controlling hardware devices of a network, such as for example switches, routers and firewalls. The invention further relates to an appropriate computer network system, a computer program and a computer program product.

2. Background Art

Related technology is discussed in U.S. Pat. No. 6,108,782, U.S. Pat. No. 6,708,171, U.S. Pat. No. 5,109,486 and in U.S. Pat. No. 4,817,080 and incorporated herein by reference.

Furthermore, familiarity with general concepts, protocols and devices currently substantially used in LAN (local area network) networking applications and in WAN (wide area network) internetworking applications is presumed. These standards are publicly available and not discussed herein in more detail. This specification also presumes some familiarity with specific network and operating system components discussed briefly in the following paragraph, such as the simple network management protocol (SNMP) for management of LAN and WAN networks, and the general functionality of a network proxy.

A local area network (LAN) is an arrangement of various hardware and software elements that operate together to allow a number of digital devices to exchange data within the LAN and also may include internet connections to external wide area networks (WANs). Typical modern LANs are comprised of one to many LAN intermediate systems that are responsible for data transmission throughout the LAN and a number of end systems that represent an end user equipment. End systems may be familiar end-user data processing equipment such as personal computers, workstations, and printers and additionally may be digital devices such as digital telephones or real-time video displays. Different types of end systems can operate together on the same LAN.

The already mentioned simple network management protocol (SNMP) is a common protocol used for managing network infrastructure over the network. SNMP is a layer 7 network and system management protocol that handles network and system management functions and can be implemented as a driver or SNMP agent interfacing through UDP or some other layer 4 protocol. Prior art SNMP installations largely were not placed in end systems because SNMP did not handle end system management or monitoring functions and because SNMP agents are processor and memory intensive.

SNMP is designed to provide a simple but powerful cross platform protocol for communicating complex data structures important to network infrastructure management. However, its power and platform-independent design makes it computationally intensive to implement, and for that reason it has limited applications in end system management or monitoring. It is primarily used in network infrastructure management, such as management of network routers and bridges.

In conventional computer performance monitoring applications or network management tools, the network management tool generates a request for data which is sent by the network management tool to a hardware device of the network which has to be controlled. The hardware device sends in return the information requested to the network management tool which then processes the data as required.

The hardware devices to be monitored are often of high complexity. The information to be monitored becomes continuously more complicated so that there are enormous amounts of information to be analyzed. Furthermore, a lot of different network management tools exist to monitor and control networks or network hardware devices, respectively. Such network management tools are, for example, fault management, configuration management, accounting, that means for example bandwidth measurements, performance, such as memory usage or CPU usage, security management, as, for example, firewall management, authentication, and userID management. These network management tools cause a high network load and impose more and more load on a single hardware device which can result in performance degradation of both network hardware devices as well as in network bandwidth. Each operator often has his own solution for monitoring and does not in general take into account other possibilities. Since a lot of users, particularly those who work worldwide, use a plurality of network components of different operators, there are several different network management tools which cause redundancy by monitoring hardware devices.

Different users, which have their own internal network, often use identical IP address ranges. By taking over those users as outsourcing users, address conflicts result. At the moment, the most common solution is to install a double monitoring system for each user, which results in double costs.

There exist so-called NAT (Network Address Translation) devices/tools that perform an address translation into identical IP addresses. These tools change only the IP address in the so-called TCP/IP header, but not the IP address inside the transported SNMP packet. The SNMP data received therefore still includes the duplicate IP addresses. Most network management tools cannot handle these duplicate addresses and therefore dedicated installations must be chosen instead of cheaper shared solutions.

SUMMARY OF THE INVENTION

To overcome limitations and problems within the prior art described above, and to overcome other limitations that will become apparent upon reading and understanding the present specification, the present invention proposes a computer network system, a network setup method, a computer program product and a computer program.

According to the present invention, a computer network system is proposed, comprising a plurality of network management tools, a network segment comprising a plurality of hardware devices and a proxy for interconnecting the network management tools with the network segment. Within the proposed computer network system, each network management tool is assigned at least one functionality for monitoring and controlling at least one hardware device which is polled by the network management tools, wherein the functionalities from different network management tools are separate from each other, and wherein the proxy is set up to consolidate requests from the different network management tools to focus it on one single request to the device to be controlled by the different network management tools.

The proxy server (or proxy) is an entity which is commonly established on a LAN where it is located between a so-called client and a so-called server. All requests of the client are then made through the proxy which in return makes requests from the server and passes the result back to the client.

In a possible embodiment of the computer network system only requests of the same or at least similar content are consolidated and focused to one single request.

According to the present invention a proxy is installed within the communication between a hardware device to be controlled and the different network management tools. The proxy has the functionality to consolidate requests from the different network management tools in order to avoid redundant requests. The proxy comprises a communication component to each of the network management tools as well as to the hardware devices to be controlled.

In a further embodiment of the computer network system, the single one request to the device is released on a predefined interval.

Furthermore, it is possible that the proxy is transparent imitating a direct device access to the different network management tools. Within the scope of the present invention this involves or means, respectively, that the proxy is possible to perform pervasive network address translation (NAT). It changes both the IP address in the TCP/IP header as well as the IP address in the content of the SNMP packet. By this it does completely translate a duplicate IP address to a unique address and enable network-monitoring tools to work with duplicate IP addresses. By this, network management tools do not detect that the devices managed have similar IP addresses. Inside the network management tools, these devices will be displayed with their translated and therefore unique IP addresses.

In a further possible embodiment of the computer network system, the proxy comprises a database for storing the requests from the different network management tools, an automatic configuration unit which is based on the requests from the different network management tools, respectively, and a polling unit for generating and sending the single one request to the hardware device.

The present invention further relates to a network setup method for monitoring and controlling at least one hardware device or network segment comprising a plurality of hardware devices by a plurality of network management tools. The network setup method comprises the steps of consolidating requests from the different network management tools to the at least one hardware device and focusing those requests on one single request to the at least one hardware device.

In one embodiment of the proposed method, a proxy is provided which is set up to consolidate the request from the different network management tools and to focus it on the one single request to the device to be controlled by the different network management tools.

It is also possible, that the requests from the different network management tools are consolidated by an automated configuration unit and compiled to configuration for a polling unit which initiates the one single request on the at least one hardware device.

Furthermore, it is possible that data polled from the at least one hardware device in reaction to the one single request are stored in the database together with the one single request, the data being provided to the network management tools via request of the same content as the one single request, thus imitating direct hardware device access to the inquiring network management tools.

According to a further embodiment of the method of the present invention, the requests from the different network management tools are first received by the proxy and stored in the database. Afterwards the requests are inspected with respect to previously stored data in the database polled from the at least one hardware device in reaction to the request with same content. In case that a request with the same content has already been received and stored in the database, the proxy sends the previously stored data to the network management tools instead of sending one single request to the at least one hardware device to be controlled, in order to reduce load on the network. In case that no request with the same content has already been received and stored in the database of the proxy, the request is translated according to a network address translation configuration. This configuration is manually stored in the database. Both the IP address in the TCP/IP address and the IP address in the SNMP content need to be changed. Afterwards one single request on which the request from the different network management tools have been focused is sent to the at least one hardware device to be controlled. The polled date are received and back-translated from the at least one hardware device in reaction to the one single request according to the network address translation configuration. Previously data polled from the at least one hardware device in reaction to the one single request is stored afterwards in the database and simultaneously sent to the network management tools.

Furthermore, the invention covers a computer program product and a computer program for carrying out the above-described methods when the computer programs are run on a computer.

Further features and embodiments of the invention will become apparent from the description and the accompanying drawings.

It will be understood that the features mentioned above and those described hereinafter can be used not only in the combination specified but also in other combinations or on their own, without departing from the scope of the present invention.

For purposes of clarity, the present discussion refers to network devices and concepts in terms of specific examples. However, the method and the network system of the present invention may operate with the wide variety of types of network devices including networks and communication systems dramatically different from specific examples illustrated in the following drawings. It should be understood that while the invention is described in terms of a computer network, the invention has applications in a variety of communication systems, such as advanced cable television systems, advanced telephone networks or any other communication system that would benefit from the network according to the present invention. It is intended that the word "network" as used in the specification and claims be read to cover any communication system unless the context requires otherwise.

BRIEF DESCRIPTION OF THE DRAWINGS

The invention is schematically illustrated in the drawing by way of example and is hereinafter explained in detail with reference to the drawing.

DETAILED DESCRIPTION OF THE PREFERRED EMBODIMENTS

Figure 1:
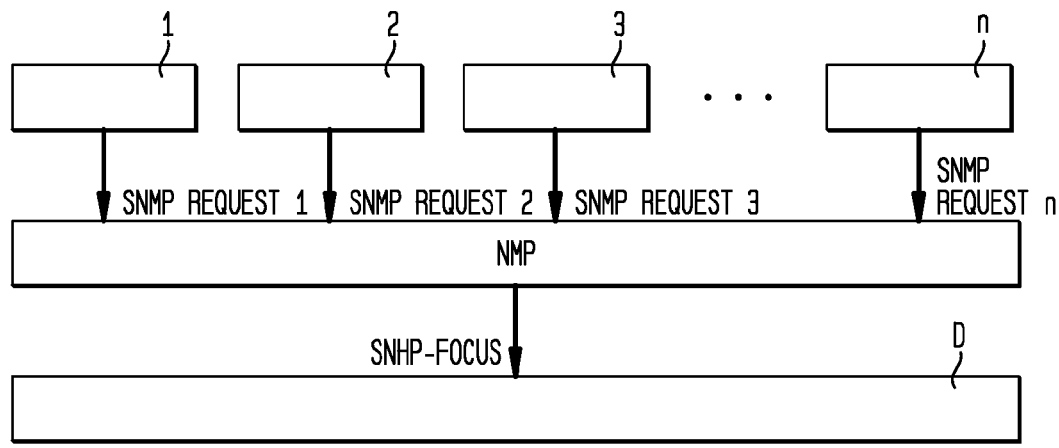
FIG. 1 shows a schematic block diagram showing a possible embodiment of a computer network system according to the present invention.

FIG. 1 is an extract of a computer network system comprising the most relevant units. FIG. 1 shows a plurality of network management tools 1 to n. These network management tools can be provided by different operators. Furthermore one hardware network device D which has to be controlled and monitored is shown. A further unit which is illustrated in FIG. 1 is a network management proxy NMP which is arranged between the one network hardware device D and the network management tools 1 to n.

It is known from the prior art that a plurality of network management tools 1 to n sends requests to a network hardware device in order to control and monitor the device, respectively. According to the prior art, there is no network management proxy NMP arranged between the tools and the network hardware device. In a complex network management environment, many different network management tools exist that use the simple network management protocol SNMP, which has already been described, to poll network management devices. The devices polled by those tools can be routers, switches or firewalls, respectively. As the number of functions required by users increases, the number of network management tools that poll each hardware device in a user environment also increases. The rising number of network management tools imposes more and more load on a single hardware device and results in performance degradation of both the network devices as well as in network bandwidth. This can eventually lead to the breakdown of the network device and thus result in service outages and user service level agreement violations.

There are many network management tools which poll the same SNMP data from network hardware devices.

Those SNMP data can be, for example, basic system information, as for example an ID, a description or a location. Systems statistics, as, for example, memory or processes, are also often polled by different network management tools. Furthermore, port and traffic statistics are often requested by different network management tools as well as device module information. The network management proxy NMP, which is arranged between the plurality of network management tools 1 to n and the illustrated network hardware device D consolidates SNMP requests 1 to n from various network management tools 1 to n. The network management proxy NMP receives the SNMP request from the different network management tools 1 to n. The network management proxy NMP focuses those requests on one single request and send this consolidated SNMP request "SNMP_focus" to the network hardware device D. This consolidated SNMP request SNMP_focus can occur for example on a predefined interval.

It is possible to imitate direct device access to the different network management tools 1 to n by using a transparent proxy mechanism.

Figure 2:
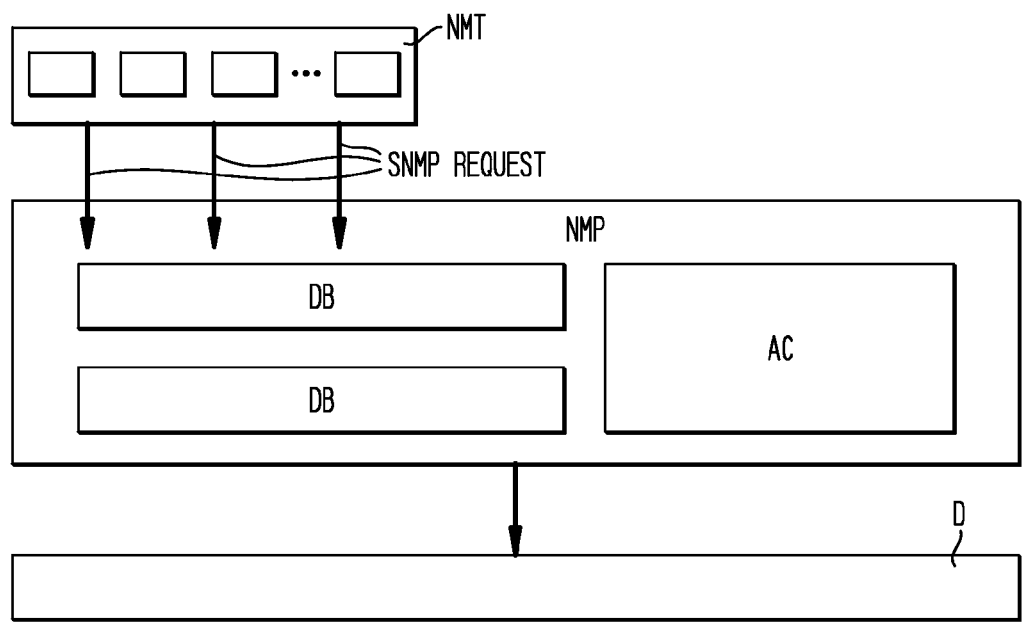
FIG. 2 is a schematic block diagram showing a possible embodiment of a proxy within a computer network system according to the present invention.

FIG. 2 illustrates an embodiment of a network management proxy NMP. There are several network management tools NMT which send a plurality of SNMP requests SNMP 1 to SNMP n to the network management proxy NMP. The network management proxy NMP is comprised substantially of three different modules. The network management proxy NMP provides a database DB, a polling unit PU and an automatic configuration unit AC. The NMP receives the SNMP request from the different network management tools and stores those requests in its database DB. The automatic configuration unit AC consolidates the SNMP requests from the different network management tools and compiles them to a configuration for the SNMP polling unit PU. A polling interval and data are automatically defined by the incoming requests from the different network management tools. The SNMP polling unit PU initiates one single request, also called bulk request, on the network hardware device D. Thus, it can avoid polling similar data multiple times. Polled SNMP answers in reaction to the bulk request are stored in the database DB and will be provided to the network management tools via SNMP requests of the same content as the previously sent bulk request. Thus, network management tools will "think" that they access the hardware device directly. The network management proxy NMP imitates direct hardware device access to these tools by using transparent proxy mechanism.

With help of such a computer network system the performance degradation of hardware devices is enormously limited. Furthermore service outages caused by parallel SNMP requests from multiple network management tools on network hardware devices is prevented. Bandwidth overhead required by network management purposes in corporate networks is also decreased.

What is claimed is:

1. A computer network system comprising:
   plurality of network management tools;
   a network segment comprising a plurality of hardware devices; and
   a proxy for interconnecting the network management tools with the network segment;
   the network management tools, each being assigned at least one functionality for monitoring and controlling at least one of said hardware devices which is polled by the network management tools, wherein the network management tools send a multitude of requests to the proxy for information from said at least one of the hardware devices, and the proxy is configured to combine a plurality of the requests from the different network management tools into a single combined request and to send said combined request to said one of the hardware devices to obtain from said at least one of the hardware devices the information requested by said plurality of the requests from the different network management tools; and wherein:
   each of the hardware devices has an IP address and some of the hardware devices have duplicate ones of the IP addresses;
   the proxy receives packets from the hardware devices, each of said packets including the IP address of the hardware device that sent said each packet; and
   when the proxy receives one of the data packets from one of the hardware devices having one of the duplicate IP addresses, the proxy changes the IP address in said one of the data packets to translate the duplicate IP address in said one of the data packets to a unique address to enable the network management tools to work with hardware devices with duplicate IP addresses.

2. The computer network according to claim 1, wherein:
   each of said packets include a header and a content portion, and both the header and the content portion of said each of the packets include the IP address of the hardware device that sent said each packet; and
   when the proxy receives said one of the data packets, the proxy changes both the IP address in the header of said one of the data packets and the IP address in the content portion of said one of the data packets to said unique address.

3. The computer network according to claim 1, wherein:
   said plurality of requests include a first request from a first of the network management tools for a first group of data items, and a second request from a second of the network management tools for a second group of data items; and the proxy combines said first request for the first group of data items and said second request for the second group of data items into a combined, bulk request for the first and second items.

4. The computer network according to claim 1, wherein:
the combined bulk request is sent by said proxy to said one of the hardware devices at a predefined interval defined by the plurality of the requests received by the proxy from the different network management tools.

5. The computer network system according to claim 1, wherein the proxy is transparent imitating a direct device access to the network management tools.

6. The computer network system according to claim 1, wherein the proxy comprises a database for storing the requests from the different network management tools, an automated configuration unit which is based on the requests, and a polling unit for generating and sending the single one request to said one of the hardware devices.

7. The computer network system according to claim 1, wherein the requests from the different network management tools are first received by the proxy and stored in a database; afterwards the requests are inspected with respect to previously stored data in the database polled from the at least one hardware devices; and in case that a request with the same content has already been received and stored in the database, the proxy sends the previously stored data to the network management tools.

8. The computer network system according to claim 7, wherein in case no request with the same content has already been received and stored in the database of the proxy, the request is translated according to a network address translation configuration stored in the database, and wherein both an IP address in an address portion of the request, and an IP address in a content portion of the request are changed; and wherein only requests of the same content are consolidated and focused to the one single request.

9. A network setup method for monitoring and controlling at least one hardware device of a network segment comprising a plurality of hardware devices by a plurality of network management tools, the method comprising the steps of:
the different network management tools sending to a proxy a multitude of requests for information from the at least one hardware device; and
the proxy combining a plurality of the requests into a single combined request and sending said combined request to the at least one hardware device to obtain from said at least one of the hardware devices the information requested by said plurality of the requests from the different network management tools; and wherein:
each of the hardware devices has an IP address and some of the hardware devices have duplicate ones of the IP addresses;
the proxy receives packets from the hardware devices, each of said packets including the IP address of the hardware device that sent said each packet; and
when the proxy receives one of the data packets from one of the hardware devices having one of the duplicate IP addresses, the proxy changes the IP address in said one of the data packets to translate the duplicate IP address in said one of the data packets to a unique address to enable the network management tools to work with hardware devices with duplicate IP addresses.

10. The method according to claim 9, wherein:
each of said packets include a header and a content portion, and both the header and the content portion of said each of the packets include the IP address of the hardware device that sent said each packet; and
when the proxy receives said one of the data packets, the proxy changes both the IP address in the header of said one of the data packets and the IP address in the content portion of said one of the data packets to said unique address.

11. The method according to claim 9, wherein:
said plurality of requests include a first request from a first of the network management tools for a first group of data items, and a second request from a second of the network management tools for a second group of data items; and
the proxy combines said first request for the first group of data items and said second request for the second group of data items into a combined, bulk request for the first and second items.

12. The method according to claim 9, wherein:
the combined bulk request is sent by said proxy to said one of the hardware devices at a predefined interval defined by the plurality of the requests received by the proxy from the different network management tools.

13. The method according to claim 9, wherein:
said plurality of requests include a first request from a first of the network management tools for a first group of data items, and a second request from a second of the network management tools for a second group of data items; and
the proxy combines said first request for the first group of data items and said second request for the second group of data items into a combined, bulk request for the first and second data items.

14. The method according to claim 9, wherein:
the combined bulk request is sent by said proxy to said one of the hardware devices at a predefined interval defined by the plurality of the requests by the proxy from the different network management tools.

15. The method according to claim 9, wherein the requests from the different network management tools are consolidated by an automated configuration unit and compiled to a configuration for a polling unit which initiates the one single request on the at least one hardware device.

16. The method according to claim 9, wherein data polled from the at least one hardware device in reaction to the one single request are stored in a database together with the one single request, said data being provided to the network management tools via request of the same content as the one single request, therein imitating direct hardware device access to the inquiring network management tools.

17. A computer program product comprising a tangible computer-readable non-transitory storage device and a computer program tangibly stored on the computer-readable device with program coding for operating a proxy of a computer network system, the computer network system comprising a plurality of network management tools, and a network segment comprising a plurality of hardware devices, wherein each of the network management tools is assigned at least one functionality for monitoring and controlling at least one of the hardware device, and the different network management tools send to the proxy a multitude of requests for information from the at least one of the hardware devices; and the computer program performing:
the proxy combining a plurality of the requests into a single combined request and sending said combined request to the at least one hardware device to obtain from said at least one of the hardware devices the information requested by said plurality of the requests from the different network management tools; and wherein:

each of the hardware devices has an IP address and some of the hardware devices have duplicate ones of the IP addresses;

the proxy receives packets from the hardware devices, each of said packets including the IP address of the hardware device that sent said each packet; and when the proxy receives one of the data packets from one of the hardware devices having one of the duplicate IP addresses, the proxy changes the IP address in said one of the data packets to translate the duplicate IP address in said one of the data packets to a unique address to enable the network management tools to work with hardware devices with duplicate IP addresses.

18. The computer program product according to claim 17, wherein:

each of said packets include a header and a content portion, and both the header and the content portion of said each of the packets include the IP address of the hardware device that sent said each packet; and when the proxy receives said one of the data packets, the proxy changes both the IP address in the header of said one of the data packets and the IP address in the content portion of said one of the data packets to said unique address.

19. The computer program product according to claim 17, wherein:

said plurality of requests include a first request from a first of the network management tools for a first group of data items, and a second request from a second of the network management tools for a second group of data items; and the proxy combines said first request for the first group of data items and said second request for the second group of data items into a combined, bulk request for the first and second items.

20. The computer network according to claim 17, wherein:

the combined bulk request is sent by said proxy to said one of the hardware devices at a predefined interval defined by the plurality of the requests received by the proxy from the different network management tools.

* * * * *